A. GROSS.
SLED.
APPLICATION FILED MAR. 29, 1918.
1,318,747.
Patented Oct. 14, 1919.
2 SHEETS—SHEET 2.
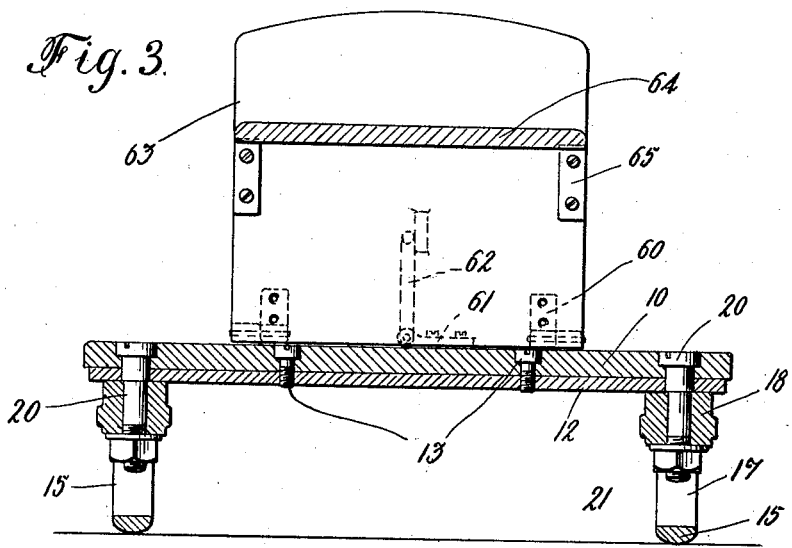
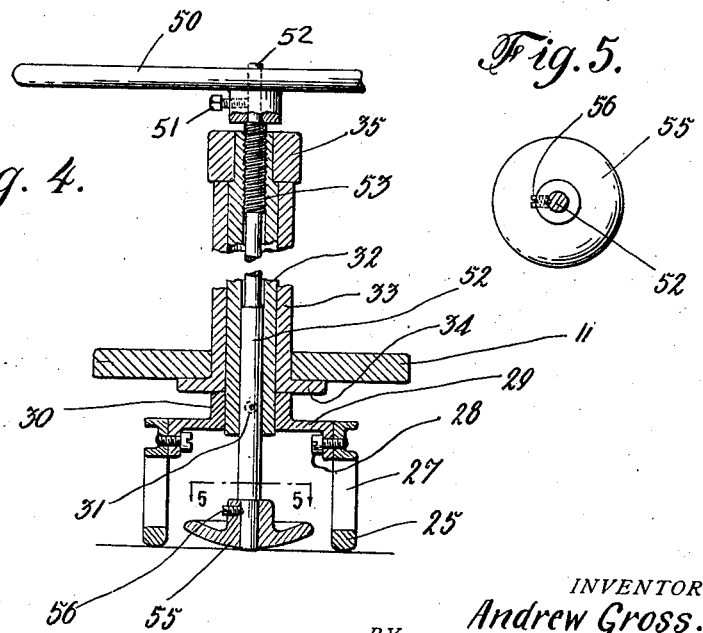
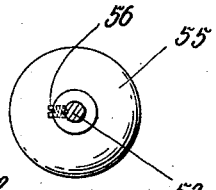
INVENTOR.
Andrew Gross.
BY
ATTORNEY

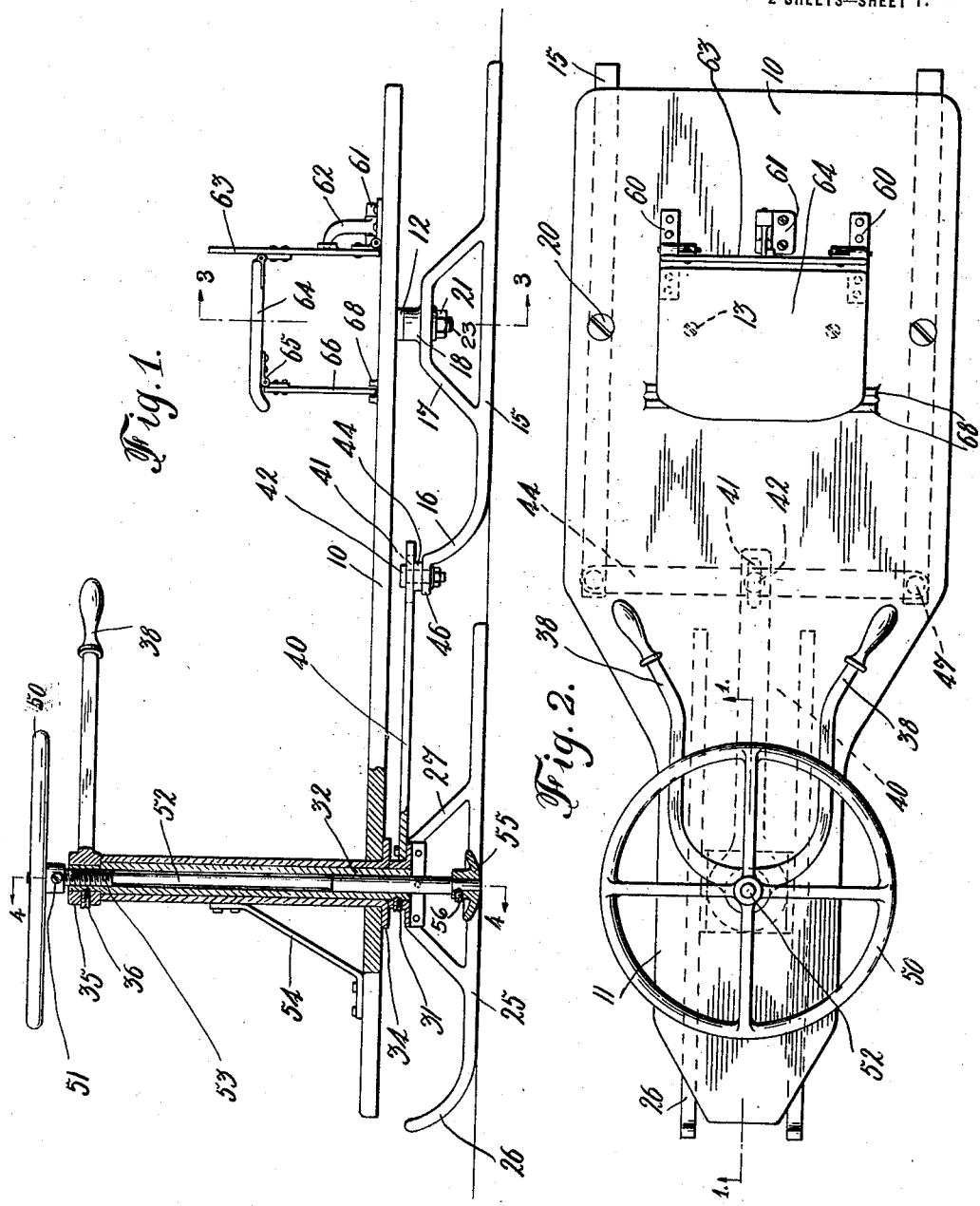

UNITED STATES PATENT OFFICE.

ANDREW GROSS, OF NEW YORK, N. Y.

SLED.

1,318,747.  Specification of Letters Patent.  Patented Oct. 14, 1919.

Application filed March 29, 1918. Serial No. 225,393.

*To all whom it may concern:*

Be it known that I, ANDREW GROSS, a citizen of the United States, residing at New York, county of New York, and State of New York, have invented certain new and useful Improvements in Sleds, of which the following is a specification.

This invention relates to improvements in sleds and particularly to types having a plurality of runners adapted to glide over the surface of snow or ice.

The principal object of the invention is to provide a sled having a seat upon which the rider may rest, the runners being arranged in pairs at the front and rear, the former being dirigible and so connected with the rear pair that sharp corners may be turned by the sled.

A further object is to provide means whereby the motion of the sled may be checked or stopped in an expeditious manner.

These and other like objects are attained by the novel construction and combination of parts hereinafter described and shown in the accompanying drawings, forming a material part of this specification, and in which:—

Figure 1 is a partial side elevational and vertical sectional view, the section being taken substantially on line 1—1 of Fig. 2.

Fig. 2 is a top plan view of a sled made in accordance with the invention.

Fig. 3 is a transverse vertical sectional view taken on line 3—3 of Fig. 1.

Fig. 4 is a similar sectional view taken on line 4—4 of Fig. 1, and

Fig. 5 is a horizontal sectional view taken on line 5—5 of Fig. 4.

Referring to the several drawings in detail, the numeral 10 designates the platform or running-board, preferably narrowed at the front end 11, and has a transverse strip 12, extending from side to side of the rear of the platform on its lower side, secured by screws 13. The rear runners 15 are of the usual type having upturned front portions 16 and are formed with raised brackets 17, the same having at their tops, hubs 18, receptive of securing bolts 20, held in position by the nuts 21 in such manner that the rear runners may pivot on the bolts 23.

The front runners 25 are arranged closer together and provided with upturned front portions 26, and similarly raised brackets 27, their flat tops being held in position by screws 28 through a web 29 having a raised hub 30 secured by the screw 31 to a tubular bushing 32, circumjacent to which is a sleeve 33, having a flange 34 at its lower end adapted to make contact with the lower side of the upturned portion of the platform.

Rigidly engaged with the upper end of the tubular bushing 32 is a hub 35 held by the screw 36 and provided with steering handles 38, so that as the same are operated the front runners are caused to turn in the same direction, in a manner similar to that of a bicycle. Rigidly engaged with the upper end of the web 29 is a bar 40 having near its rearward outer end a longitudinal slot 41, in which is engaged the stem of a bolt 42, passing through the center of a transverse bar 44, engaged with the extending end 46 of the upturned runner elements 16, by means of pins 47, in such manner that as the connecting bar 40 is turned angularly with respect to the edges of the platform 10, motion is communicated through the transverse bar 44 to the rear runners 15, causing them to turn in an opposite direction from the front runners 25. Thus it may be seen that the sled can be steered so as to be moved within a circle of relatively small radius.

A hand wheel 50 is held by the set screw 51 to the end of a rod 52, having screw-threads 53 suited to the internally screw-threaded upper end of the tubular bushing 32, the shaft 52 extending through at its lower end and being engaged with a curved contact brake shoe 55, by means of the set screw 56, the brake shoe being shown substantially level with the lower portion of the front runners 52, between which it is located, and which may be raised and lowered by operating the hand wheel 50, and it will be understood that when the brake shoe 55 is in a raised position the front runners 25 alone make contact with the surface, but should it be desired to abate the momentum of the sled or to stop the same, the hand screw may be so maneuvered as to cause the brake shoe 55 to move downward firmly against the surface, causing cessation of motion of the sled.

Arranged upon the upper surface of the platform 10 are a pair of hinges 60 having therebetween another hinge 61 with which is engaged an arm 62 having a part contactable, when in a raised position, with the back 63 of a seat 64 hinged to the backing 63 and having connected at its front edge, by a hinge 65, a support 66, the lower edge of which is engaged between the raised cleats 68, so that when the seat is extended for use it is maintained in a substantially rigid position. When it is desired to fold the seat, so as to permit the rider to stand upon the platform 10, the arm 62 is turned laterally, the seat 64 raised, causing the support 66 to fold closely upon its lower surface, whereupon the seat 64 is turned downward, closely adjacent to the back 63, which in turn is folded over the rear end of the platform 10, and when the seat is thus folded the cleats 68 make contact with the shoes of the rider, assisting in supporting the same in a standing position.

Having thus described my invention, what I claim as new and desire to secure by Letters Patent, is:—

In a sled, the combination with a platform having a narrow front end, and a pair of runners, each independently pivotally engaged to the lower side of said platform, of a pair of front runners pivoted near the center of the front portion of said platform, means for turning said front runners, an arm rigidly engaged with said front runners extending rearwardly, said arm having a slot, a transverse bar engageable with the rear end of said slot, and connections between the ends of said transverse bar and said rear runners whereby they are turned simultaneously, but oppositely to said front runners.

In testimony whereof I have affixed my signature.

ANDREW GROSS.

Copies of this patent may be obtained for five cents each, by addressing the "Commissioner of Patents, Washington, D. C."